(12) United States Patent
Chigasaki et al.

(10) Patent No.: US 7,369,333 B2
(45) Date of Patent: May 6, 2008

(54) LENS UNIT AND IMAGE CAPTURING APPARATUS

(75) Inventors: Masaaki Chigasaki, Toyonaka (JP); Takashi Kato, Sakai (JP)

(73) Assignee: Konica Minolta OPTO, Inc., Tokyo (JP)

( * ) Notice: Subject to any disclaimer, the term of this patent is extended or adjusted under 35 U.S.C. 154(b) by 0 days.

(21) Appl. No.: 11/702,481

(22) Filed: Feb. 5, 2007

(65) Prior Publication Data

US 2007/0183065 A1    Aug. 9, 2007

(30) Foreign Application Priority Data

Feb. 8, 2006    (JP) .............................. 2006-030872

(51) Int. Cl.
G02B 7/02    (2006.01)
G03B 3/00    (2006.01)

(52) U.S. Cl. ......................................... 359/819; 396/96

(58) Field of Classification Search ................ 359/817, 359/819
See application file for complete search history.

(56) References Cited

U.S. PATENT DOCUMENTS 6,115,197 A    9/2000    Funahashi 6,850,373 B2    2/2005    Mihara et al.
2003/0160902 A1    8/2003    Mihara et al.
2006/0098306 A1*    5/2006    Yoshitsugu et al. ......... 359/819

FOREIGN PATENT DOCUMENTS

JP    2000-131610    5/2000
JP    2003-169236    6/2003

* cited by examiner

Primary Examiner—Jordan Schwartz
Assistant Examiner—James C Jones
(74) Attorney, Agent, or Firm—Brinks Hofer Gilson & Lione

(57) ABSTRACT

A lens unit for focusing light onto an image pickup device, including: a frame body; a first lens group having a first optical axis and being movable between an operating position and a storing position; a bending member for bending the light along the first optical axis to a perpendicular second direction and being held movable between a bend position and a retract position to create a space for storing the first lens group; a second lens group for leading the bent light to the image pickup device, and being held movable in the second direction; a moving tube which moves the first lens group; a stationary tube fixed on the frame body and having a feed member to move the moving tube, wherein the stationary tube has an opening through which the bending member moves between the bend position and the retract position.

13 Claims, 10 Drawing Sheets

LENS UNIT AND IMAGE CAPTURING APPARATUS

CROSS REFERENCE TO RELATED APPLICATION

The present application is based on Japanese Patent Application No. 2006-030872 filed with Japan Patent Office on Feb. 8, 2006, the entire content of which is hereby incorporated by reference.

BACKGROUND OF THE INVENTION

1. Field of the Invention

This invention relates to a lens unit and an image capturing apparatus, and particularly to a lens unit which collapses optical member in a bending optical system.

2. Background Technology

In recent years, as the use of personal computers has been increasing, there has also been widespread use of digital cameras for which images can be easily uploaded to personal computers. Also, digital cameras are now generally incorporated into information processing devices such as mobile computers, cellular phone, personal digital assistants (PDAs) and the like. As the use of these types of digital cameras has become more widespread, there has been increasing demand for more compact digital cameras, and thus there is need for the lens unit to be even smaller in size.

It has been proposed that the lens unit is made more compact by reducing the depth direction of the digital camera, such that even when the magnification is changed, the total length of the photographing lens unit is not changed (Patent Documents 1,2 and 3). In these documents, a bending member is provided on the optical path and after the optical path is bent by approximately 90 degrees, the optical images are formed on the image pickup device using the successive lens group.

However, in the three aforementioned documents, because lens are disposed closer to the object side than to the bending member, the length of the depth direction of the digital camera is limited by the length between the bending member and the object-side lens.

In order to solve this problem, a technique has been proposed in which the bending member is moved and the object side lens is retracted into the space that is created due to the movement of the bending member and thus the camera is compact when not in use (Patent Documents 4).

[Patent Document 1] Japanese Patent Application Laid-Open Publication No. 2000-131610

[Patent Document 2] U.S. Pat. No. 6,850,373B2

[Patent Document 3] US Patent Application No. 2003-16092A1

[Patent Document 4] Japanese Patent Application Laid-Open Publication No. 2003-169236

In the lens unit described in Patent Documents 4, a collapsible structure is disclosed in which when the object side lens is switched from the operating state to a non-operating state, the holding frame which holds the lens is supported by two holding shafts, and one of the shafts supports the lens such that it slides in the optical axis direction, and the other shaft supports the lens such that rotation in the optical axis direction is prevented at the time of sliding, and the lens frame is moved from the operating position to the storing position by driving the cam plate in the holding shaft vicinity.

However, in this structure, in the optical system which has a large interval between the bending member and the object side lens, or the high power zoom lens in which the object side lens is moved due to magnification change, the amount of movement of the lens associated with collapsing becomes large, and in the non-operating state it is difficult to reduce the depth direction of the digital camera, and the lens unit becomes large in size.

This invention was conceived in view of these problems and the object thereof is to provide in the bending optical lens, a compact lens unit in which the depth direction of the camera in the non-operating state is shortened even for an optical system in which the object side lens projects to a greater extent than the bending member and for a high power zoom lens in which the object side lens moves to a great extent.

SUMMARY

An embodiment reflecting one aspect of the present invention to solve the problems described above is a lens unit for focusing light from an object onto an image pickup device, the lens unit includes:

a frame body;

a first lens group into which incoming light flux from the object enter along a first optical axis;

a first holding member for holding the first lens group so that the first lens group is movable, in a first optical axis direction, between an operating position in which the first lens group projects out from the frame body and a storing position in which the first lens group is stored inside the frame body;

a bending member for bending the light flux along the first optical axis to a second optical axis direction which is substantially at right angles to the first optical axis;

a bend holding member for holding the bending member so that the bending member is movable between a bend position where the bending member bends the light flux into the second optical direction and a retract position where the bending member retracts to create a space for storing the first holding member;

a second lens group for leading the light flux, which has been bent into the second optical axis direction, to the image pickup device side;

a second holding member for folding the second lens group so that the second lens group is movable in the second optical axis direction;

a moving tube which moves the first holding member between the operating position and the storing position;

a stationary tube which is fixed on the frame body and provided with a feed member to move the moving tube in the first optical axis direction, wherein the stationary tube has an opening through which the bend holding member moves between the bend position and the retract position.

An embodiment reflecting another aspect of the present invention is an image capturing apparatus, which includes:

an image pickup device for converting an optical image into electrical signals; and an optical system for forming an image of an object on the image pickup device, the optical system including:

a first lens group into which incoming light flux from the object enter along a first optical axis;

a bending member for bending the light flux along the first optical axis to a second optical axis direction which is substantially at right angles to the first optical axis; and a second lens group for leading the light flux, which has been bent into the second optical axis direction, to the image pickup device side, a frame body to include the optical system;

a collapsing lens tube capable of expansion and contraction in the first optical axis, the collapsing lens tube having an opening in a side face of the tube; and a bend holding member for holding the bending member so that the bending member is capable of moving, through the opening of the collapsing lens tube, between a bend position where the bending member bends the light flux into the second optical axis direction and a retract position where the bending member retracts to create a space for storing the first lens group, wherein the bending member resides at the bend position when the collapsing lens tube is in a expansion state, and resides at the retract position when the collapsing lens tube is in a contraction state.

BRIEF DESCRIPTIONS OF THE DRAWINGS

These and other objects, advantages and features of the invention will become apparent from the following description thereof taken in conjunction with the accompanying drawings in which.

Figure 5A:
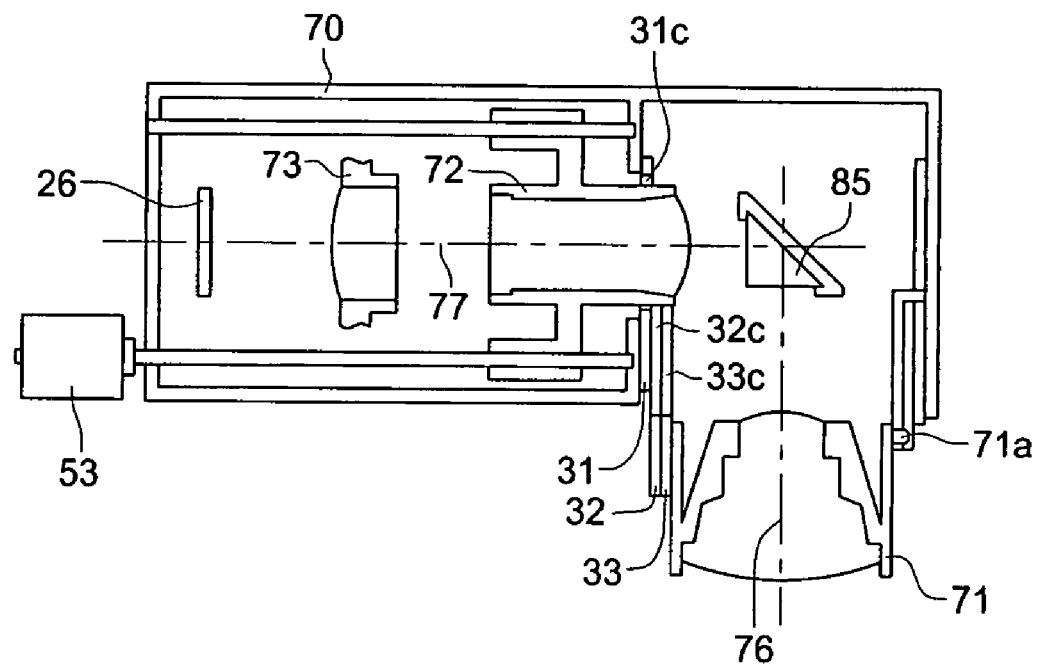
Figure 5B:
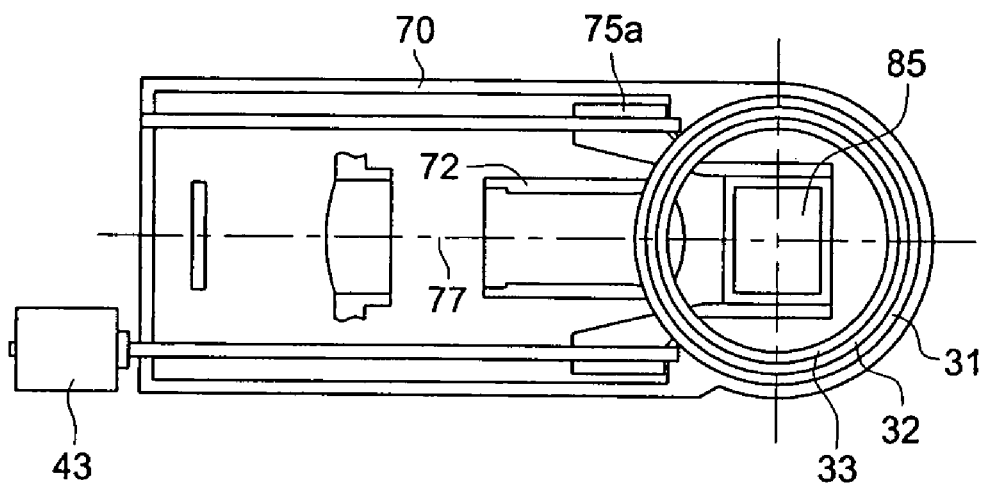
Figure 7A:
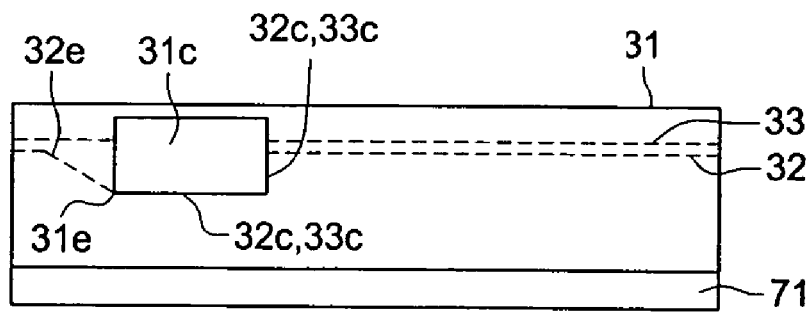
Figure 7B:
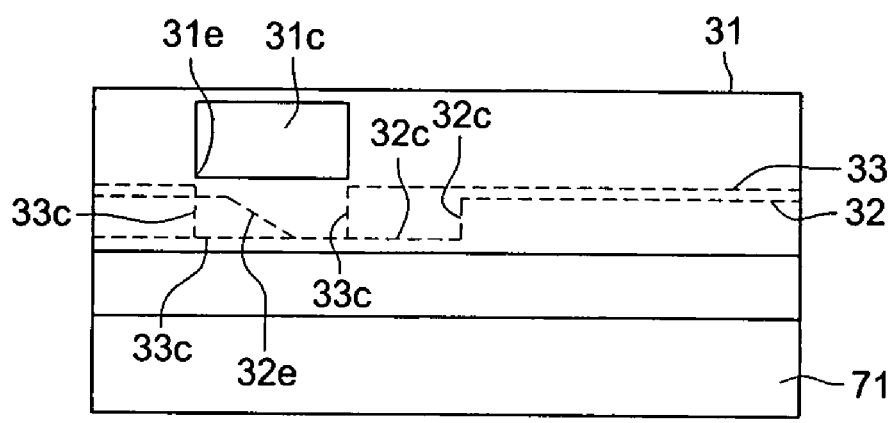
Figure 7C:
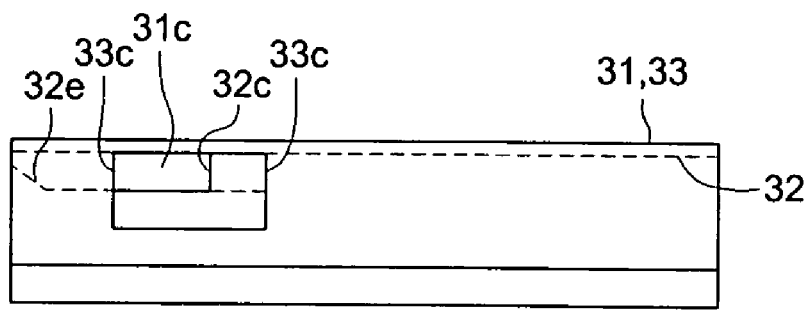
Figure 8A:
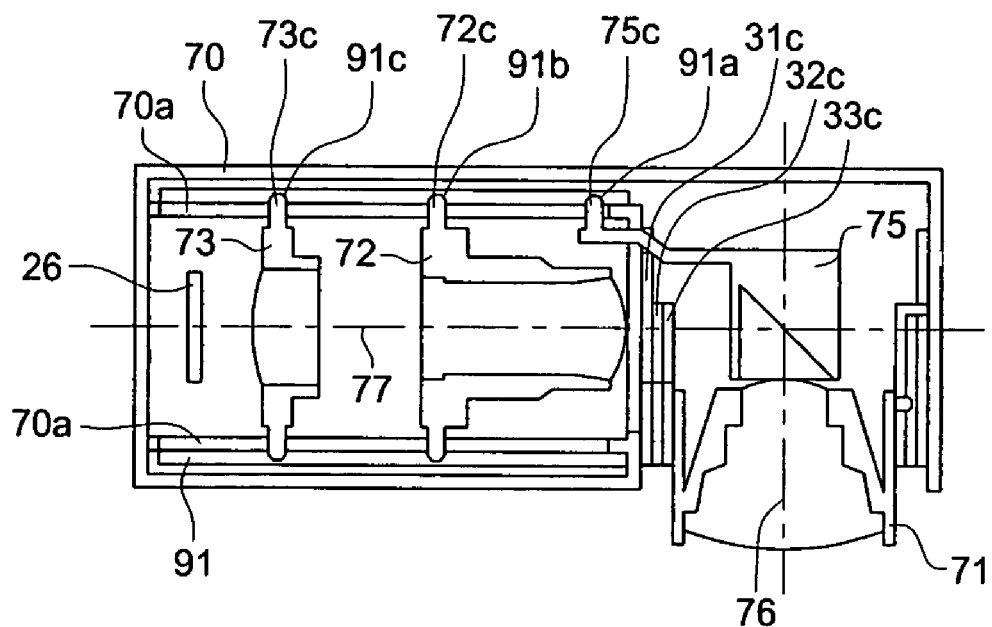
Figure 8B:
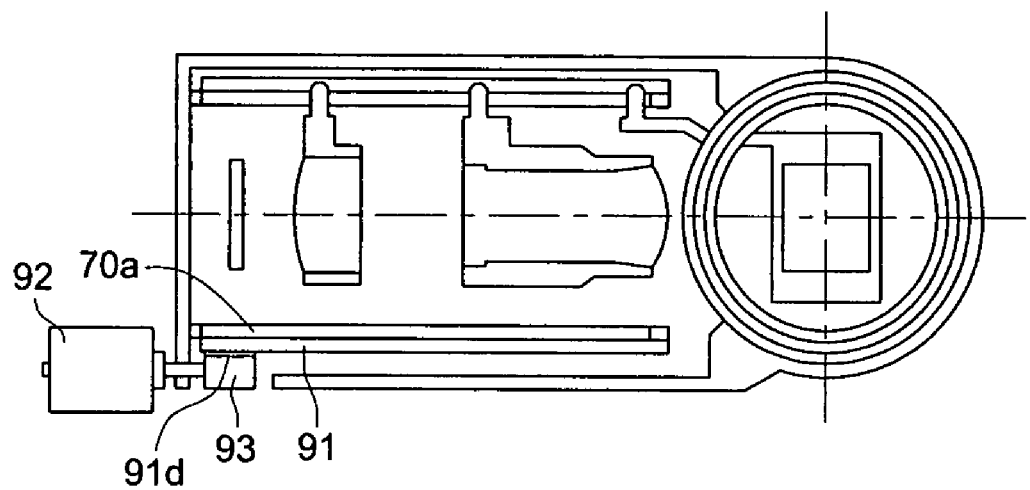
Figure 9A:
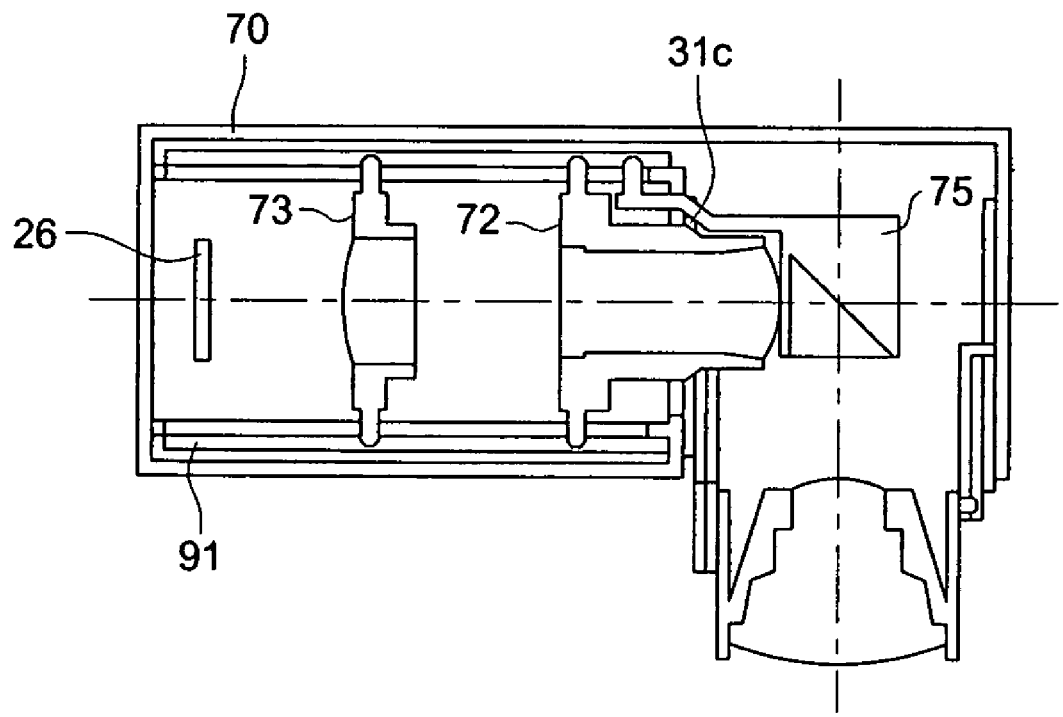
Figure 9B:
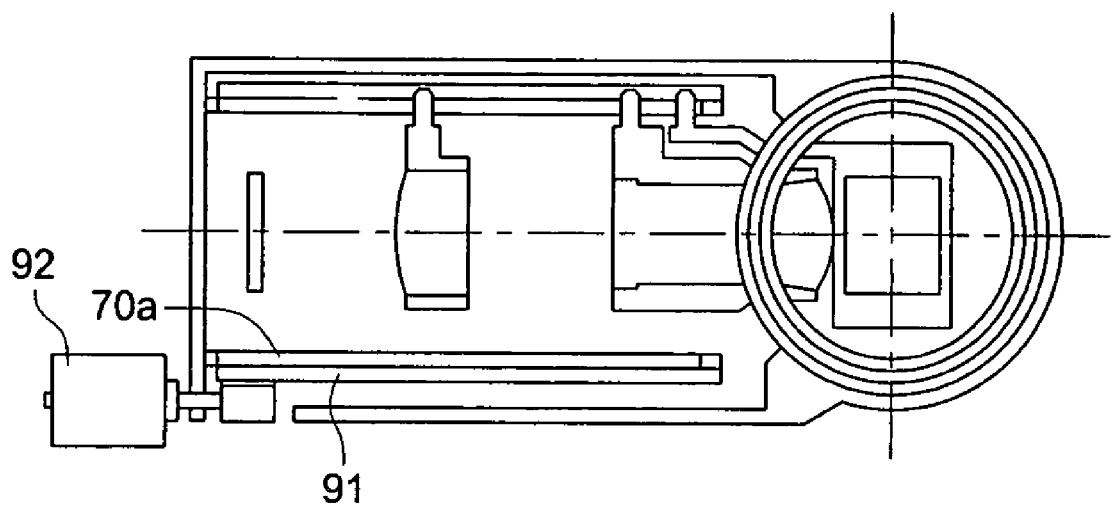

FIG. 4(a) is an exploded view of the stationary tube of the lens unit of the first embodiment; FIG. 4(b) is an exploded view of the rotating tube; FIG. 4(c) is an exploded view of the forward moving tube; and FIG. 4(d) is an exploded view of the first holding member;

FIG. 5(a) is a perspective side view of the structure of the lens unit of the first embodiment in the telescopic state, and FIG. 5(b) is the perspective front view;

FIG. 6(a) is a perspective side view of the structure of the lens unit of the first embodiment in the storing state, and FIG. 6(b) is the perspective front view;

FIG. 7(a) is an exploded view of the lens unit of the first embodiment in the wide angle state; FIG. 7(b) is an exploded view in the telescopic state and FIG. 7(c) is an exploded view in the storing state;

FIG. 8(a) is a perspective side view of the structure of the lens unit of the second embodiment in the wide angle state, and FIG. 8(b) is the perspective front view;

FIG. 9(a) is a perspective side view of the structure of the lens unit of the second embodiment in the telescopic state, and FIG. 9(b) is the perspective front view; and FIG. 10(a) is a perspective side view of the structure of the lens unit of the second embodiment in the storing state, and FIG. 10(b) is the perspective front view.

DETAILED DESCRIPTION OF THE PREFERRED EMBODIMENTS

Figure 1A:
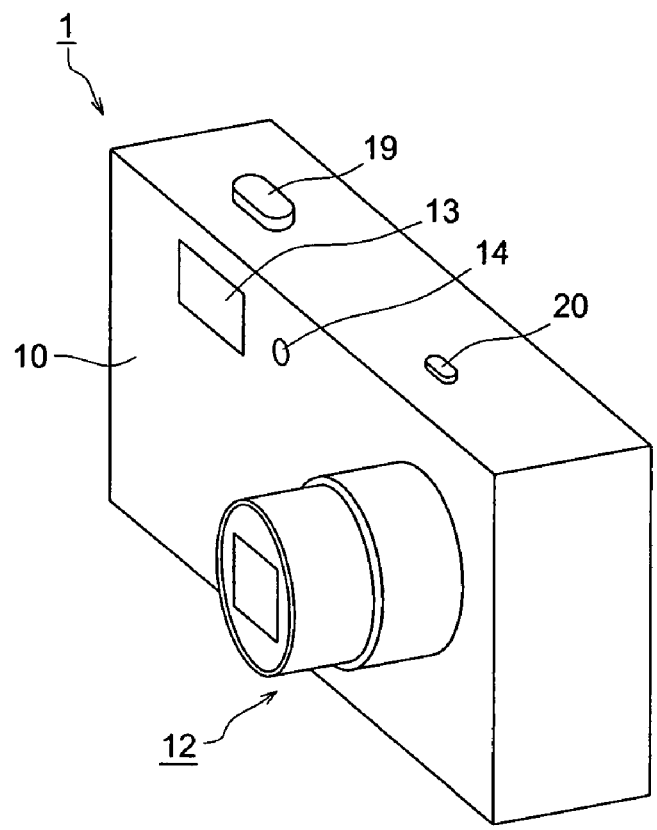
FIG. 1(a) is a perspective view showing the exterior of the digital camera of the embodiments as a pattern drawing.
Figure 1B:
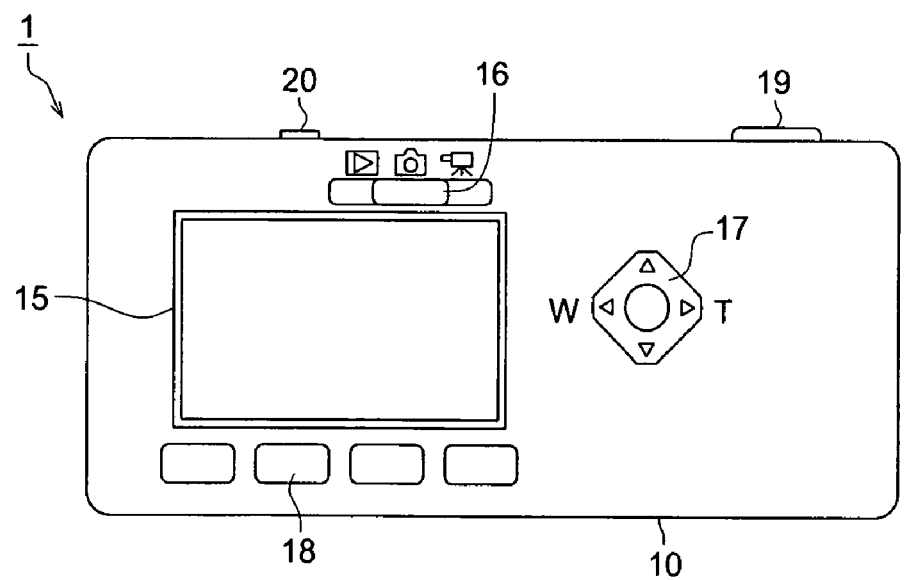
FIG. 1(b) is the back view thereof.

The embodiments of this invention will be described with reference to the drawings in the following. The exterior of the digital camera 1 is shown in FIG. 1 as a pattern drawing. FIG. 1(a) is a perspective view and FIG. 1 (b) is a back view.

The digital camera 1 comprises a substantially rectangular camera body 10 and a lens unit 12 which projects from the camera body 10. The projection direction of the lens unit 12 is the depth direction, and the lateral length direction of the camera body 10 is the lateral direction and the vertical direction in FIG. 1 is the height direction.

The digital camera 1 comprises a lens unit 12 at the front surface, a flash emission section 13, a self timer lamp 14, a display section 15 at the back surface, a mode setting switch 16, an arrow key 17, multiple operations keys 18, a release button 19 at the top surface, and a power button 20.

The lens unit 12 is a zoom lens and when it is at the operating position, a portion of the lens projects from the front surface of the camera body 10, and it further projects when there is magnification change from the wide angle end to the telescopic end, and the remaining lens portion bends the optical axis substantially at right angles using the bending member that is described hereinafter, and is disposed in the lateral direction inside the camera body 10. The portion of the lens that projects out at the time of use is collapsed and stored at the storing position for storing inside the camera body 10 when the camera is being carried and photographing is not being done.

The flash emitting portion 13 emits flash for illuminating the object being photographed. The self timer lamp 14 indicates that preparation for self-timed photography is in progress by being lit.

The display section 15 on the back surface is a liquid crystal display device, and displays various information including images that have been photographed as well as the setting status of the digital camera 1, and operation information and the like. The mode setting switch 16 is a slide type, and is used for setting operation modes for digital camera 1 such as photograph and play. The arrow key 17 has four contact points which are up, down, left and right, and is used for moving the cursor which is shown in the display section 15. The arrow key 17 is also used for adjusting the focal distance of the lens unit 12. The operation keys 18 are used for switching between the items for display on the display section 15, selecting the displayed items, and for setting the functions for the digital camera 1. The release button 19 operates at 2 levels. The half pressed state of the release button 19 gives instructions for preparation for photography of the image to be recorded, and the fully pressed state of the release button 19 gives instruction for photographing of the image to be recorded.

Figure 2:
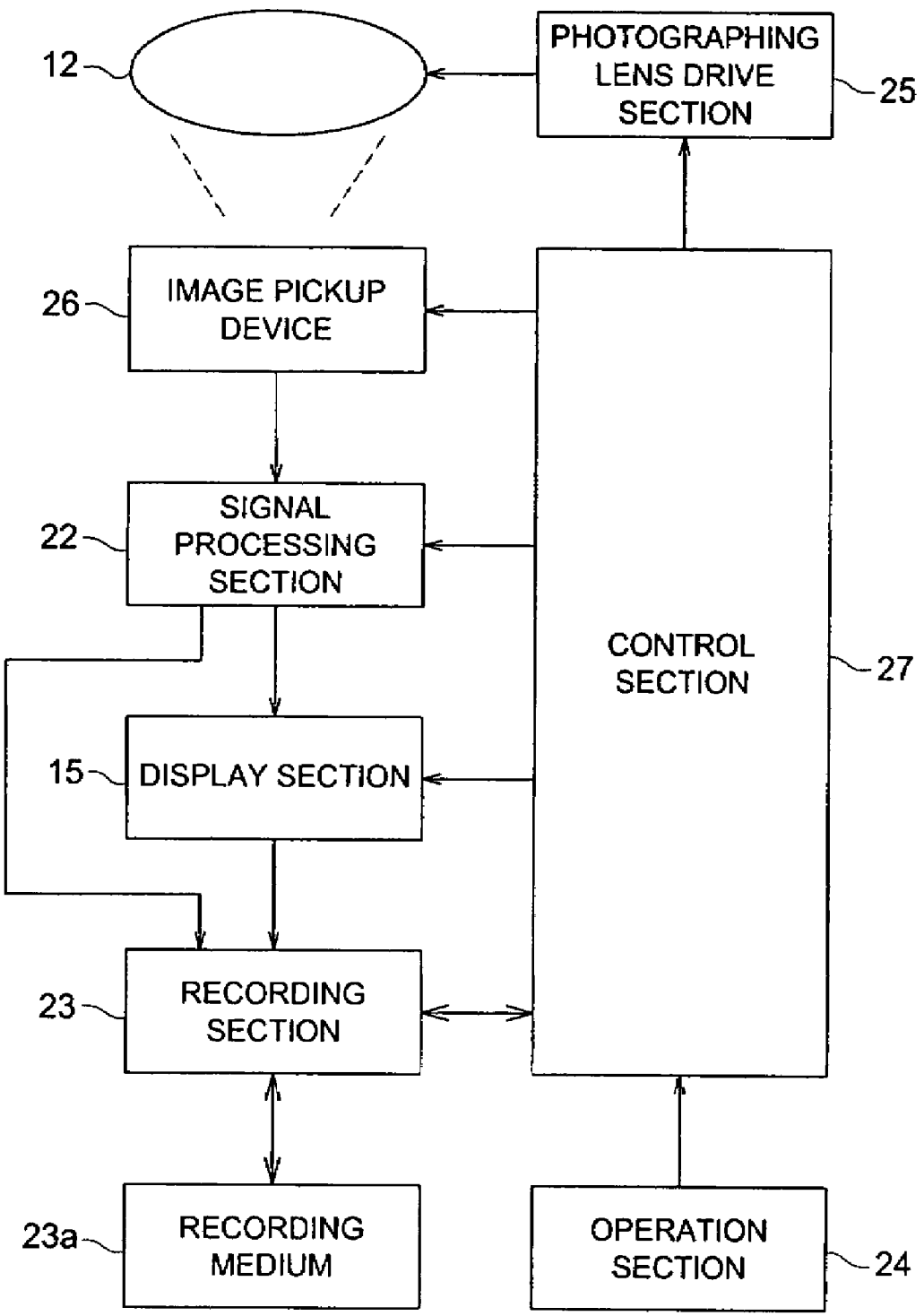
FIG. 2 is a pattern drawing of the digital camera structure of the embodiments.

FIG. 2 is a pattern diagram showing the structure of the digital camera 1. The digital camera 1 comprises a lens unit 12 and a display section 15 as well as an image pickup device 26, a signal processing section 22, a recording section 23, an operating section 24, a photographing lens drive section 25 and a control section 27. The image pickup device 26 is a CCD area sensor and it outputs signals which display the amount of light received for each pixel. The image processing section 22 processes the signals from the image pickup device 26 and creates image data which displays the photographed image. The recording section 23 records the image data created by the image processing section 22 in a removable recording medium 23a and image data is read from the recording medium 23a for display of image reproduction and display. The operation section 24 comprises the mode setting switch 16, the arrow key 17, the operation key 18, the release button 19 and the power button 20 and the information pertaining to the button operated by the user is transmitted to the control section 27.

The photographing lens controls the driving of motors such as the zoom motor, the focus motor, the cylinder collapsing motor and the aperture motor for adjusting light amount. The photographing lens drive section 25 may also be provided at the lens unit 12.

The control section 27 has function which perform a series of operations which include controlling the operation of each part of the digital camera 1 based on a control program, and when the release button 19 is half pressed, preparations for photographing the object such as setting of the exposure control value and focus adjustment are performed and when the release button 19 is fully pressed, the image pickup device 26 is exposed and the image signal obtained due to the exposure are subjected to prescribed image processing and recorded on the recording medium 23a.

Figure 3A:
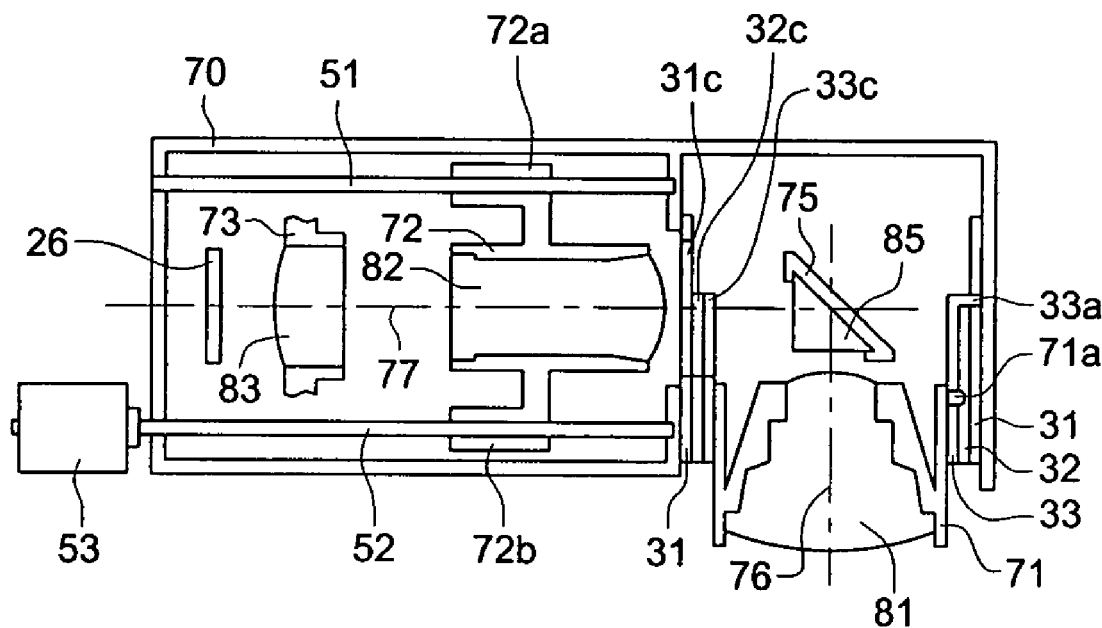
FIG. 3(a) is a perspective side view of the structure of the lens unit of the first embodiment in the wide angle state.
Figure 3B:
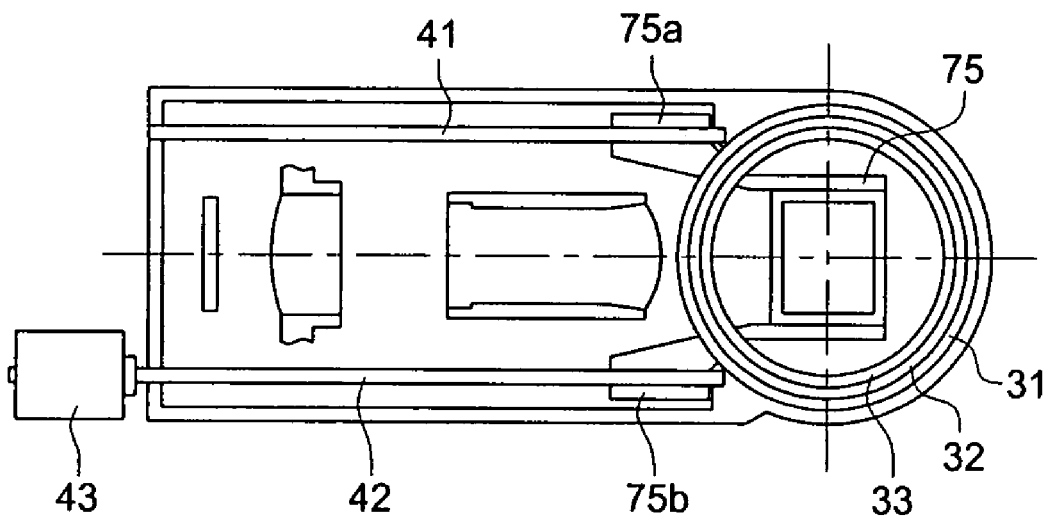
FIG. 3(b) is the perspective front view.
Figure 6:
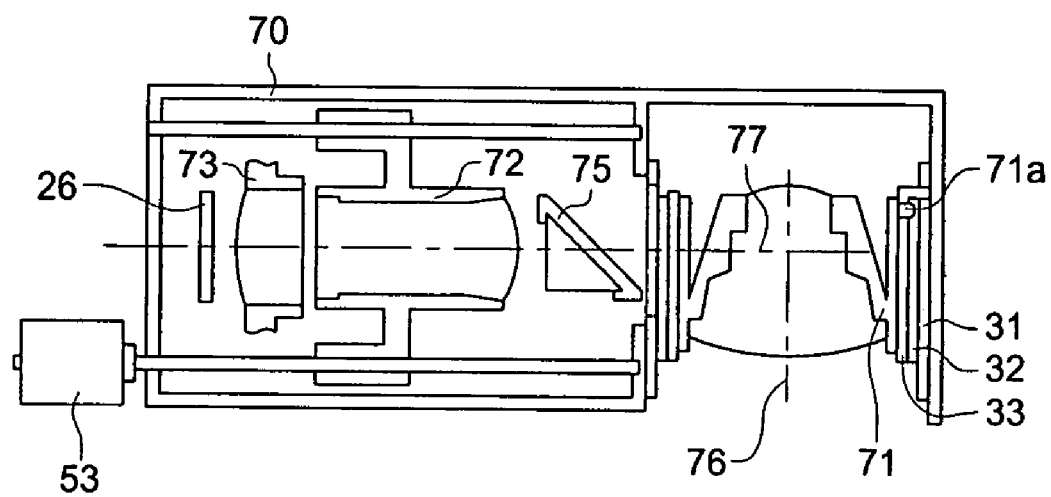
Figure 6:
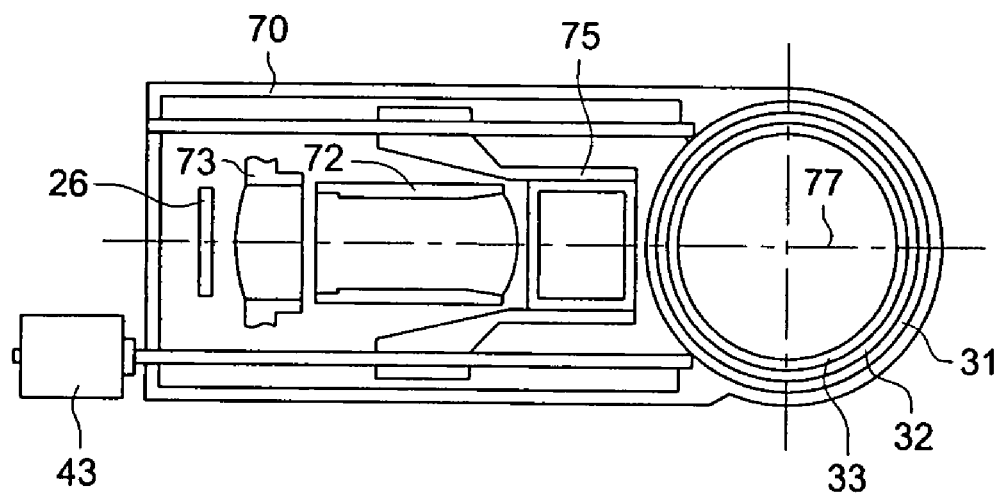

Next, the structure of the lens unit 12 will be described. FIG. 3(a) to FIG. 7(c) show the first embodiment of this invention. FIG. 3(a) and FIG. 3(b) show the wide angle state of the lens unit 12; FIG. 5(a) and FIG. 5(b) show the telescopic state of the lens unit 12; FIG. 6 (a) and FIG. 6(b) show the storing state of the lens unit 12, and for each of the drawings (a) shows the perspective side view and (b) shows the perspective front view. It is to be noted that in FIG. 3(b), FIG. 5(b), and FIG. 6(b), the first lens group which is the object side lens group and the holding frame which holds that lens group are omitted.

First, the structure of the lens unit 12 will be described using FIG. 3(a) and FIG. 3(b).

Starting from the object side, the photographing lens comprises a first lens group 81 and a prism 85 which is the bending member, a second lens group 82 and a third lens group 83. The first lens group 81 is on the first optical axis 76, and the second lens group 82 and the third lens group 83 are successive lens and are on the second optical axis 77. The photographing lens focuses light from the object to be photographed onto the image pickup device 26.

The prism 85 is a triangular prism whose cross-section is that of a right-angled isosceles triangle, and the prism 85 is disposed such that its inclined plane forms a 45° angle with respect to the first optical axis 76 and the second optical axis 77, and the first optical axis 76 is bent substantially at right angles to the direction of the second optical axis 77.

At the time of magnification change, the first lens group 81, the second lens group 82, and the third lens group 83 move, and at the time of focusing, the third lens group 83 moves. When the cylinder collapses, the second lens group 82 moves toward the image pickup device 26 side and the prism 85 moves into the spaces that is created when the second lens group 82 moves, and then the first lens group 81 moves into the space created when the prism 85 moves and is thereby stored. It is advantageous for the third lens group 83 to move when magnification changes in order to reduce the total length, but the third lens group 83 may also be fixed to image pickup device 26. In addition, in a photographing optical system in which the prism 85 and the second lens 82 are separated by a large distance, the second lens group does not have to be moved.

The first holding frame 71 holds the first lens group 81; the prism holding frame 75 holds the prism 85; the second holding frame 72 holds the second lens group 82; and the third holding frame 73 holds the third lens group 83.

Next the structure of magnification changing drive will be described. The structure of magnification changing drive of the first holding frame 71 comprises: a stationary tube 31 which is fixed to the frame body 70 which is the cylindrical structure whose center is the first optical axis 76; the rotating tube 32 which engages with the feeding member of the stationary tube 31 and moves in the direction of the first optical axis 76 while rotating; and a forward moving tube 33 which moves forward integrally with the rotating tube 32 in the direction of the first optical axis 76, and the moving tube comprising the rotating tube 32 and the forward moving tube 33. The stationary tube 31 has an opening 31c, and the opening 31c is a hole which penetrates the second optical axis 77 and the second holding frame 72 which moves due to magnification change and the prism holding frame 75 which moves due to collapsing is passed through the hole. When the motor (not shown) for magnification change between wide angle and telescope rotates, the first holding member 71 moves forward to the object side in the direction of the first optical axis 76 due to the feeding member of the stationary tube 31 and the moving tube. It is to be noted that the structure is described hereinafter in more detail.

Next, the structure of the magnification change drive of the second holding frame 72 will be described. The guide shaft 51 is parallel to the second optical axis 77 and the front end thereof is fixed to the frame body 70, and fits into the slide guide hole 72a of the second holding frame 72, and guides the second holding frame 72 such that it can move in the direction of the second optical axis 77 without inclining with respect to the second optical axis 77. The drive shaft 52 is parallel to the guide shaft 51 at the side opposite to the guide shaft with respect to the second optical axis 77 and a helical screw is formed on the outer peripheral surface and the helical screw screws into the engagement screw 72b of the second holding frame 72. The motor 53 has a rotation shaft and the rotation shaft engages with the drive shaft. When the motor 53 is rotated for magnification change from wide angle to telescope, the second holding frame 72 moves forward at the prism 85 side in the direction of the second optical axis 77 due to the twist lead of the drive shaft 52.

The magnification change drive of the third holding frame 73 is not shown but it has the same structure as the second holding frame 72, and the guide shaft guides the third holding frame 73 such that it can move in the direction of the second optical axis 77 without inclining with respect to the second optical axis 77. When the motor is rotated for magnification change from wide angle to telescope, the third holding frame 73 moves forward at the image pickup device 26 side in the direction of the second optical axis 77 due to the twist lead of the drive shaft that is coupled with the motor.

Figure 4:
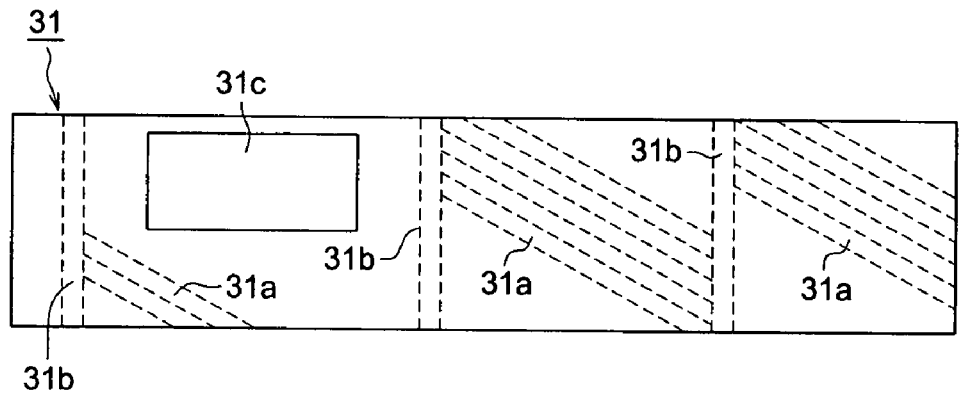
Figure 4:
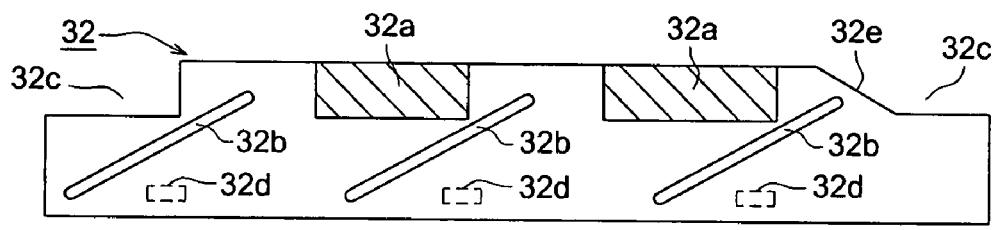
Figure 4:
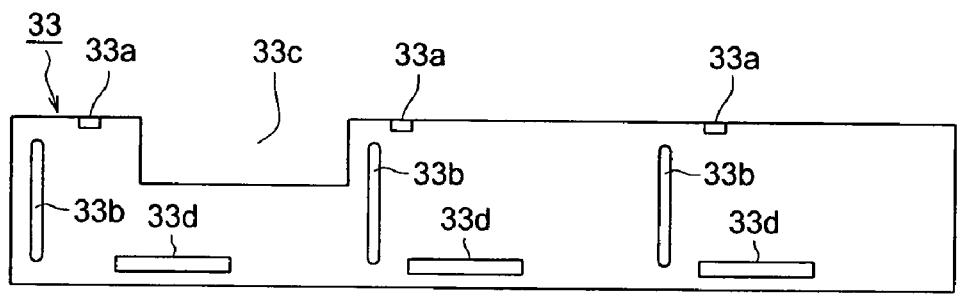
Figure 4:
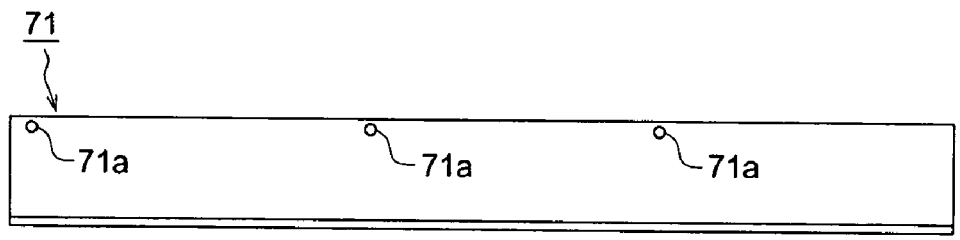

Next, the structure of the magnification change drive of the first holding frame 71 will be described in detail using FIG. 4(a) to (d). FIG. 4(a) to (d) show exploded views of the stationary tube 31 from the outer periphery side and the lower side of the drawing is the object side. FIG. 4(a) is the stationary tube 31; FIG. 4 (b) is the rotating tube 32; FIG. 4(c) is the forward moving tube 33 and FIG. 4(d) of the first holding member 71 and these are all exploded views.

The stationary tube 31 comprises an inner helicoid 31a which is a female helicoid on the inner peripheral surface; forward moving grooves 31b which extend in the first optical axis direction 76 at three locations; and openings 31c provided at the portion of inner helicoid 31a where there are no helicoids. The inner helicoid 31a is split into three by the forward moving grooves 31b of the helicoid portions that are divided into three, and the helicoid portion that has the opening 31c is longer than the other helicoid portions. The size of the opening 31c is a size through which the second holding frame 72 which moves due to magnification change and the prism holding frame 75 which moves by being collapsed can pass. In addition, the opening 31c is a hole, but it may also be formed as a notch with which the end surface side of the stationary tube 31 being opened.

The rotating tube 32 comprises outer helicoids (male-helicoids) 32a which screws into the inner helicoids 31a of the stationary tube 31, on the outer peripheral surface;

tapered cam grooves 32b; notches 32c, and bayonet claw portions 32d. The notch 32c is at the position opposing the opening 31c in the stationary tube 31 in photographing states of the wide angle end and the telescopic end. In addition, one end of the notch 32c is tapered and even if the rotating tube 32 and the stationary tube 31 rotate relative to each other at the time of magnification change, the opening 31c is never closed, and the taper 32e is also provided to ensure rigidity of the rotating tube 32.

The forward moving tube 33 diameter fits into the rotating tube 32 so as to be rotatable, and comprises a forward moving rib 33a that engages with the forward moving groove 31b of the stationary tube 31; a forward moving hole 33b; a notch 33c and a bayonet portion 33d. The notch 33c is at the position opposing the opening 31c in the stationary tube 31 in photographing states of the wide angle end and the telescopic end and it does not cover the opening 31c. The bayonet portion 33d engages with the bayonet claw portion 32d of the rotating tube 32 and the forward moving tube 33 rotates with respect to the rotating tube 32 and they move forward integrally in the direction of the first optical axis 76.

A cam follower 71a is fixed to the first holding frame 71 and the cam follower 71a engages with the cam groove 32b of the rotating tube 32 and the forward moving hole 33b of the forward moving tube 33. When the rotating tube 32 rotates, the first holding cylinder 71 moves forward in the direction of the first optical axis 76 in accordance with the lead of the cam groove 32b.

The helicoid 31a of the stationary tube 31 and the helicoid 32a of the rotating tube 32 are formed so as to rotate further from the wide angle end in the direction opposite to the telescopic end. Also the cam groove 32b of the rotating tube 32 extends further from the wide angle end in the direction opposite to the telescopic end. As a result, the rotating tube 32 can rotate even beyond the operating position which is the wide angle end of the magnification change region, and when the rotating tube 32 rotates further from the wide angle end, the first holding member 71 moves from the wide angle end to the storing position.

The structure of collapsing will be described by returning to FIG. 3(a) and FIG. 3(b). For collapsing from the wide angle end of the operating position to the storing position, the prism holding member 75 moves the holding member 71 into the space created by moving from the bending position for bending the first optical axis 76 to the second optical axis 77 to the retract position for movement to the image pickup device 26 side.

First, the structure for storing the prism holding member 75 will be described. The guide shaft 41 is parallel to the second optical axis 77 and the end portion thereof is fixed to the frame body 70 and it fits into the slide guide 75a of the prism holding member 75. The prism holding member 75 is guided such that it can move in the direction of the second optical axis 77 without inclining with respect to the second optical axis 77. The driving shaft 42 is parallel to the guide shaft 41 at the side opposite to the guide shaft 41 with respect to the second optical axis 77 and a helical screw is formed on the outer peripheral surface and the helical screw screws into the engagement screw 75b of the prism holding member 75. The motor 43 has a rotation shaft and the rotation shaft engages with the drive shaft 42. When the motor 43 rotates, the prism holding member 75 moves forward to the image pickup device 26 side in the direction of the second optical axis 77 due the twist lead of the drive shaft 42, and there is switching from the bending position at which the first optical axis 76 is bent to the second optical axis 77 to the retract position at which the first holding member 71 is stored.

The structure for storing the first holding member 71 will be described using the magnification change drive structure of the first holding member 71. That is to say, as described above the magnification change drive mechanism comprises a stationary tube 31, helicoids 31a and 32a which each further rotate from the wide angle end of the rotating tube 32 and a cam groove 32b which extends further from the wide angle of the rotating tube 32. Due to this structure, when the rotating tube 32 rotates further from the operating position which is the wide angle end to the storing position, the first holding member 71 moves further to the prism holding frame 75 side from the wide angle end position, and the first holding member 71 moves into the space created by movement of the prism holding member 75.

Next, the magnification change operation will be described. When there is magnification change from the wide angle sate shown in FIGS. 3(a) and (b) to telescope, the first lens group 81, the second lens group 82 and the third lens group 83 are moved to the object side while changing the respective lens intervals to reach the telescopic state shown in FIGS. 5(a) and (b).

First, when the arrow key 17 of the digital camera shown in FIGS. 1(a), (b) and FIG. 2 is operated to be set from the wide angle end to the telescopic end, the photographing lens section 25 drives the second holding frame 72 drive motor 53, the first holding frame 71 drive motor which is not shown and the third holding frame 73 drive motor based on zoom control signals output from the control section 27.

When the first holding frame drive motor 71 is rotated from the wide angle state in FIGS. 3(a) and (b), the rotation torque is transmitted to the rotating tube 32. When the rotation torque is transmitted to the rotating tube 32, in the rotating tube shown in FIGS. 4(a)-(d), the outer helicoids 32a screw into the inner helicoids 31a of the stationary tube 31 and are thus moved in the direction of the first optical axis 76 while rotating with respect to stationary tube 31. The bayonet portion 33d of the forward moving tube 33 engages with the bayonet claw portion 32d of the rotating tube 32 and the forward moving rib 33a engages with the forward moving groove 31b of the inner surface of the stationary tube 31 and thus the stationary tube 31 and the rotating tube 32 moves forward integrally in the direction of the first optical axis 76 as the rotating tube 32 moves forward while rotating in the direction of the first optical axis 76.

In the first holding cylinder 71, the cam follower 71a that is fixed to the first holding cylinder 71 engages with the cam groove 32b of the rotating tube 32 and the forward moving hole 33b of the forward moving tube 33, and thus when the rotating tube 32 and the forward moving tube 33 rotate relative to each other, the state shown in FIG. 5 is achieved and the position of the telescopic end is reached.

Similarly, when the second holding frame drive motor 53 is rotated from the wide angle state in FIGS. 3(a) and (b), the drive shaft 52 which is coupled with the motor 53 rotates. The second holding frame 72 is guided in the direction of the second optical axis 77 due to the lead of the engagement screw 72b of the second holding frame 72 that is screwed to the drive shaft 52 and by the guide shaft 51 fitting into the slide guide hole 72a of the second holding frame 72 and thus moves forward. As shown in FIGS. 5(a) and (b), the second holding frame is moved forward to the prism 85 side in the direction of the second optical axis 77 through the opening 31c of the stationary tube 31 and each of the notches 32c and 33c of the rotating tube 32 and the forward moving tube 33 and reaches the telescopic end position.

In addition, the third holding frame 73 performs the magnification change operation in the same manner as the second holding frame 72, and when the third holding frame 73 drive motor is rotated from the wide angle state of FIGS. 3 (a) and 3(b), the third holding frame 73 is moved forward due to the rotating action of the motor and the coupled drive shaft and the forward guiding action of the guide shaft. As shown in FIGS. 5(a) and (b), the third holding frame 73 is moved forward to the prism 85 side in the direction of the second optical axis 77 and reaches the telescopic end position.

Next, the collapsing operation will be described.

When the power button 20 of the digital camera 1 shown in FIGS. 1(a) and (b) and FIG. 2 is pressed and the digital camera 1 is turned OFF, the photographing lens drive section 25 drives the second holding frame 72 drive motor 53, the first holding frame 71 drive motor which is not shown, and the prism holding frame 75 drive motor 43 based on collapse control signal output from the control section 27.

The photographing lens drive section 25 first drives the motor 53 from the wide angle state of FIGS. 3(a) and (b), then moves the second holding frame 72 to the image pickup device 26 side using the drive shaft 52 and then the motor 43 is driven. The prism holding frame 75 is then moved to the retract position at the image pickup device 26 side by the drive shaft 42 and lastly, the first holding frame 71 drive motor is driven to rotate in the opposite direction due to the magnification change action. When the first holding frame 71 drive motor is driven so as to rotate in the opposite direction, the rotating tube 32 is moved toward the first optical axis 76 while being rotated, and the forward moving tube 33 and the rotating tube 32 move forward (backward) integrally and the first holding cylinder 71 moves forward (backward) and into the space created by the movement of the prism holding frame 75, and reaches the storing position as shown in FIG. 6. The motors 43 and 53 may be operated simultaneously.

In order to switch from the storing position to the operating position, the photographing lens drive section 25 performs control such that each motor is driven from the operating position to the storing position and then in the opposite order. That is to say when the power button 20 of the digital camera 1 shown in FIGS. 1(a) and (b) and FIG. 2 is pressed and the digital camera 1 is turned ON, the photographing lens drive section 25 first drives the first holding frame 71 drive motor based on the photographing preparation signals output from the control section 27, moves the first holding frame 71 shown in FIGS. 6(a) and (b) to the operating position at the object side, then rotates the drive motor 43 and the prism holding frame 75 is then moved to the bending position at the first holding frame 71 side on the second optical axis 77. Lastly, the motor 53 motor is driven and the second holding frame 72 is moved to the prism holding frame 75 side on the second optical axis 77 and switched to the operating position which is the wide angle position. The motors 43 and 53 may be operated simultaneously.

Next, the state of the opening 31c and the notches 32c and 33c at the operating position and the storing position will be described using FIGS. 7(a)-(c). FIG. 7 (a), FIG. 7(b), and FIG. 7(c) are exploded views which show the wide angle state, the telescopic state and the storing state respectively of the stationary tube 31 when viewed from the outer periphery and the lower side of the drawing is the object side.

In the wide angle state of FIG. 7(a), the notch 32c of the rotating tube 32 is at a position which is substantially in contact with the lower end surface and the right end surface of the opening 31c of the stationary tube 31. The notch 33c of the forward moving tube 33 is at a position which is substantially in contact with the lower end surface and the right and left end surfaces of the opening 31c of the stationary tube 31. In the telescopic state of FIG. 7(b), the notch 32c moves to the object side while the rotating tube 32 rotates and thus moves away from the opening 31c. When a switch is made from wide angle to telescope, the taper portion 32e of the notch 32c moves so as to contact the edge 31e of the opening 31c. In addition, the notch 33c moves away from the opening 31c because the forward moving tube 33 moves forward to the object side. In this manner, in the magnification change region, the opening 31c is never closed by the notches 32c and 33c and at the time of magnification change, the second holding frame 72 may be passed through the opening.

In the storing state of FIG. 7(c), the notch 32c moves from the prism 85 side while the rotating tube 32 rotates, and the opening 31c is closed. In addition, the notch 33c closes the opening 31c when the forward moving tube 33 moves forward to the prism 85 side. It is to be noted that the rotating tube 32 may be rotated further such that the opening 31c is completely closed.

As described above, when the prism holding member 75 is moved to the retract position and the first holding member 71 is stored in the space created when the prism holding member 75 moves to the retract position, the feed member of the stationary tube 31 and the rotating tube move the first holding member 71 to the storing position in the direction of the first optical axis 76. Because the stationary tube 31 has an opening 31c through which the prism holding member 75 can enter and exit in moving between the bending position and the retract position, even in the case of an optical system in which the object side lens extends to larger extent than the prism 85 which is the bent member, to the object side, or in the case of high power zoom lens in which the foremost lens group moves, the depth direction of the digital camera can be shortened when the camera is not in use and the lens unit 12 can be made more compact.

In addition, the collapse structure of the first lens group 81 comprises a rotating tube which moves in the direction of the first optical axis 76 while rotating and a forward moving tube 33 which moves forward integrally with the rotating tube 32 in the direction of the first optical axis 76, and when in the operating position, the notches 32c and 33c of the rotating tube 32 and the forward moving tube 33 respectively are at the position that opposes the opening 31c, at the operating position, the collapse mechanism is not large in size. Also because the lens can move inside the opening 31c, this structure can be used for high power zoom lens.

Furthermore, because the notches 32c and 33c of the rotating tube 32 and the forward moving tube 33 close the opening 31c of the stationary tube 31 at the storing position, when photographing is not being done, damage such as burn-in of the image pickup device 26 is prevented as unneeded exposure does not occur. Also, because the rotating tube 32 and the forward moving tube 33 moves to the position where the opening 31c is closed, the rotating tube 32 and the forward moving tube 33 can be shortened in the direction of the first optical axis 76 and the depth direction of the lens unit 12 when it is not in use can be shortened. In this embodiment, the opening 31c is not completely closed, but the effect is sufficiently achieved at this level.

In multiple inner helicoids 31a with multiple splits of the stationary tube 31, the inner helicoids 31a is divided into multiple parts, and the split helicoids portions with the opening 31c at the portions that do not have the helicoids have a longer peripheral length than the other split helicoid portions. As a result, the helicoid which drives the first holding cylinder 71 can be formed and the opening 31c can be made wider and lens with large outer diameter (bright lens) can be moved.

In addition, because at the time of magnification change, the collapse mechanism is used for moving the holding frame 71, the number of necessary parts for the magnification change mechanism and the collapse mechanism is decreased and this allows a simple structure and low manufacturing cost.

In addition, at the time of switching from the operating position to the storing position, because the prism holding member 75 is first moved to the retract position and then the first holding member 71 is moved to the storing position, there is no need to make the opening 31c large and thus the stationary tube 31 is not large in the direction of the first optical axis 76 and thus the lens unit 12 can be made more compact.

Figure 10:
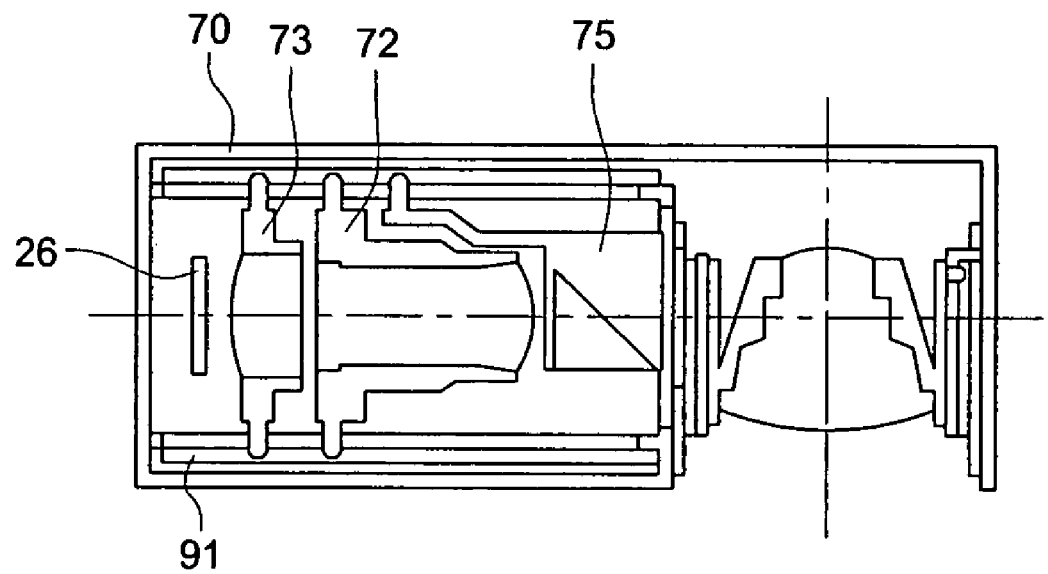
Figure 10:
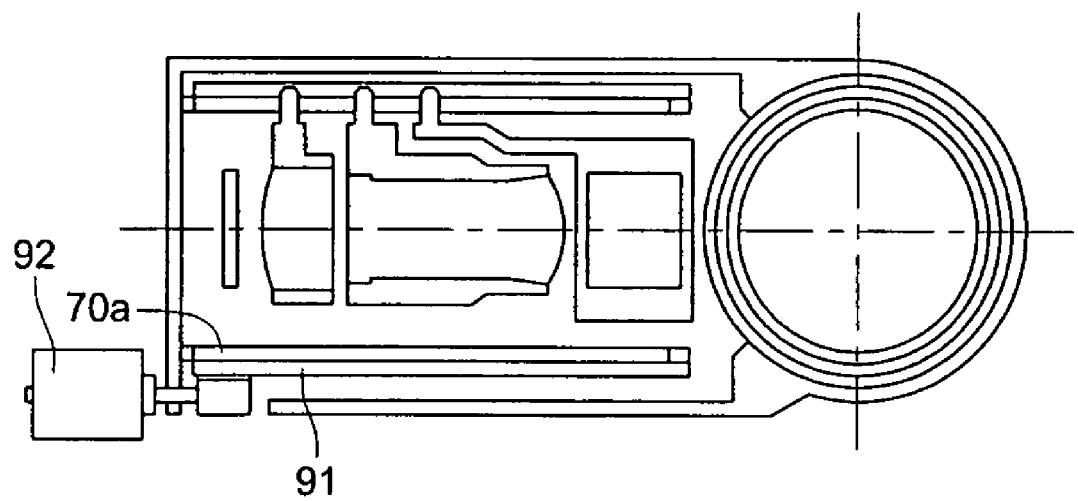

FIG. 8(a) to FIG. 10(b) show the second embodiment of the lens unit 12 and FIG. 8(a) and FIG. 8(b) show the lens unit 12 in the wide angle state; FIG. 9(a) and FIG. 9(b) show the lens unit 12 in the telescopic state; and FIG. 10(a) and FIG. 10(b) show the lens unit 12 in the storing state. In FIG. 8(b), FIG. 9(b), and FIG. 10(b), the holding frame 71 and the first lens group 81 are omitted for ease of viewing. It is to be noted that in the following description, the functional members which are the same as those of the first embodiment have been assigned the same numbers and descriptions thereof have been omitted. The lens structure, the lens/prism holding member structure and the collapse mechanism and magnification change mechanism of the first holding cylinder are the same as those of the first embodiment. The magnification change mechanism of the second holding frame 72 and the third holding frame 73 and collapse mechanism of the second holding frame 72 and the prism holding frame 75 which are different from those of the first embodiment will be described.

In FIGS. 8(a) and 8(b), the cam cylinder 91 fits into the frame body 70 so as to be rotatable, and the cam groove 91a, 91b, and 91c are provided on the inner periphery thereof. The cam 91a engages with the cam follower 75c of the prism holding member 75; the cam 91b engages with the cam follower 72c of the second holding frame 72; and the cam 91c engages with the cam follower 73c of the third holding frame 73. In addition, the cam followers 72c, 73c and 75c engage with the forward moving hole 70a in the frame body 70.

The cam groove 91a is a circular groove in the magnification change region, and even when the cam cylinder 91 rotates, the prism holding member 75 is fixed to the image pickup device 26 without moving in the optical axis direction, and it is a tapered groove from the wide angle position to the retract position, and when the cam cylinder 91 rotates, the prism holding member 75 moves to the retract position at the image pickup device 26 side in the direction of the second optical axis 77.

The cam groove 91b is a trajectory cam groove which follows the magnification change movement of the lens in the magnification change region, and when the cam cylinder 91 rotates, the second holding frame 72 moves along the cam configuration in the direction of the second optical axis 77. The cam groove 91b is a taper groove with an incline that is smaller than that of the cam groove 91a from the wide angle position to the storing position, and when the cam 91 rotates, the second holding frame 72 moves to the image pickup device 26 side in the direction of the second optical axis 77, and the amount of movement is smaller than that of the prism holding frame 75.

The cam groove 91c is a trajectory cam groove which follows the magnification change movement of the lens in the magnification change region, and when the cam cylinder 91 rotates, the third holding frame 73 moves along the cam configuration in the direction of the second optical axis 77 and it is a circular groove from the wide angle position to the storing position, and even when the cam cylinder 91 rotates, third holding frame 73 does not move in the optical axis direction.

In addition, the cam cylinder 91 has a peripheral gear 91d at the end of the image pickup device 26 side and the peripheral gear 91d meshes with the gear 93 which couples with the rotating shaft of the motor 92, and is rotated when the motor 92 rotates.

Next the magnification change operation will be described. When the arrow key 17 of the digital camera 1 in FIGS. 1(a) and (b) and FIG. 2 is operated for setting from the wide end to the telescopic end, the photographing lens drive section 25 drives the first holding frame 71 drive motor (not shown) and the cam cylinder 91 drive motor 92 based on zoom control signals output from the control section 27.

When the first holding frame 71 drives motor is rotated from the wide angle state of FIGS. 8(a) and (b), as is the case in the first embodiment, the first holding frame 71 moves forward to the object side as shown in FIGS. 9(a) and (b), and reaches the telescope end position. When the cam cylinder 91 drive motor 92 is rotated, the cam 91 rotates and the second holding frame 72 and the third holding frame 73 move forward along the cam trajectory of the cam grooves 91b and 91c respectively, and reach the telescopic end shown in FIGS. 9(a) and (b). At that time, because the cam groove 91a is a circular groove at the magnification change region, the prism holding frame 75 is fixed to the image pickup device 26 without moving.

For the collapsing operation, when the power button 20 of the digital camera 1 shown in FIGS. 1(a) and (b) and FIG. 2 is pressed to turn OFF the camera, the photographing lens drive section 25 drives the first holding frame 71 drive motor (not shown) and the drive motor 92 for cam cylinder 91 based on collapse control signals output from the control section 27.

From the wide angle state in FIG. 8, the photographing lens drive section 25 first drives the motor 92 and then rotates the cam cylinder 91. When the cam cylinder 91 rotates, prism holding frame 75 and the second holding frame 72 move to the retract position at the image pickup device 26 side following the cam lead of the cam grooves 91a and 91b respectively. Next, the first holding frame 71 drive motor is driven to rotate opposite to the magnification change. When the first holding frame 71 drive motor is driven in the reverse direction, the first holding cylinder 71 moves into the space created when the prism holding frame 75 moves, and reaches the storing position shown in FIG. 10.

The same effects as those of the first embodiment can be obtained with the structure described above, and furthermore, the mechanism for driving the holding frame which moves the second optical axis 77 is formed of one cam cylinder 91 and one motor 92 and therefore has a simple structure, and malfunction is less likely and manufacturing cost is low.

It is to be noted that in the above embodiments, the example of zoom lens are given, but the lens unit of this invention may be applied to single vision lens. In particular, this invention is effective in single vision optical systems in which the object side lens extend to a greater extent than the bending member.

What is claimed is:

1. A lens unit for focusing light from an object onto an image pickup device, comprising:
   a frame body;
   a first lens group into which incoming light flux from the object enter along a first optical axis;
   a first holding member for holding the first lens group so that the first lens group is movable, in a first optical axis direction, between an operating position in which the first lens group projects out from the frame body and a storing position in which the first lens group is stored inside the frame body;
   a bending member for bending the light flux along the first optical axis to a second optical axis direction which is substantially at right angles to the first optical axis;
   a bend holding member for holding the bending member so that the bending member is movable between a bend position where the bending member bends the light flux into the second optical direction and a retract position where the bending member retracts to create a space for storing the first holding member;
   a second lens group for leading the light flux, which has been bent into the second optical axis direction, to the image pickup device side;
   a second holding member for holding the second lens group so that the second lens group is movable in the second optical axis direction;
   a moving tube which moves the first holding member between the operating position and the storing position; and
   a stationary tube which is fixed on the frame body and provided with a feed member to move the moving tube in the first optical axis direction,
   wherein the stationary tube has an opening through which the bend holding member moves between the bend position and the retract position,
   wherein the feed member is an inner helicoid, and the moving tube further comprises:
      a rotating tube which has an outer helicoid which screws into the inner helicoids; and
      a forward moving tube which moves integrally with the rotating tube in the first optical axis direction, wherein each of the rotating tube and the forward moving tube has a respective notch which faces the opening at the operating position.

2. The lens unit of claim 1, wherein the respective notch is formed so that the rotating tube and the forward moving tube respectively covers the opening at the storing position.

3. The lens unit of claim 1, wherein the inner helicoid is divided into multiple divided helicoids in the peripheral direction of the stationary tube, and the opening is disposed at a section where a part of one of the multiple helicoids is lacking, wherein a circumferential length of a divided helicoid in the section where the opening is disposed is longer than the circumferential length of any other one of the divided helicoids.

4. The lens unit of claim 1, wherein the moving tube moves the first holding member in the first optical axis direction when magnification is changed.

5. The lens unit of claim 1, wherein the second holding member moves through the opening when magnification is changed.

6. An image capturing apparatus, comprising:
   an image pickup device; and
   a lens unit for focusing light from an object onto the image pickup device, the lens unit further comprising:
      a frame body;
      a first lens group into which incoming light flux from the object enters along a first optical axis;
      a first holding member for holding the first lens group so that the first lens group is movable in a first optical axis direction, between an operating position in which the first lens group projects outwardly from the frame body, and a storing position in which the first lens group is stored inside the frame body;
      a bending member for bending the light flux along the first optical axis to a second optical axis direction, which is substantially at right angles to the first optical axis;
      a bend holding member for holding the bending member so that the bending member is movable between a bent position where the bending member bends the light flux into the second optical direction, and a retract position where the bending member retracts to create a space for storing the first holding member;
      a second lens group for leading the light flux, which has been bent into the second optical axis direction, to the image pickup device side;
      a second holding member for holding the second lens group so that the second lens group is movable in the second optical axis direction;
      a moving tube which moves the first holding member between the operating position and the storing position;
      a stationary tube which is fixed on the frame body and provided with a feed member to move the moving tube in the first optical axis direction, wherein the stationary tube has an opening through which the bend holding member moves between the bent position and the retract position;
   a power button for switching power ON and OFF; and
   a control section which moves the first holding member from the operating position to the storing position after moving the bend holding member from the bending position to the retract position, when the power button is turned OFF in cases where the first holding member is at the operating position.

7. An image capturing apparatus, comprising:
   an image pickup device; and
   a lens unit for focusing light from an object onto the image pickup device, the lens unit further comprising:
      a frame body;
      a first lens group into which incoming light flux from the object enters along a first optical axis;
      a first holding member for holding the first lens group so that the first lens group is movable in a first optical axis direction, between an operating position in which the first lens group projects outwardly from the frame body, and a storing position in which the first lens group is stored inside the frame body;
      a bending member for bending the light flux along the first optical axis to a second optical axis direction, which is substantially at right angles to the first optical axis;
      a bend holding member for holding the bending member so that the bending member is movable between a bend position where the bending member bends the light flux into the second optical direction, and a retract position where the bending member retracts to create a space for storing the first holding member;

a second lens group for leading the light flux, which has been bent into the second optical axis direction, to the image pickup device side;

a second holding member for holding the second lens group so that the second lens group is movable in the second optical axis direction;

a moving tube which moves the first holding member between the operating position and the storing position;

a stationary tube which is fixed on the frame body and provided with a feed member to move the moving tube in the first optical axis direction, wherein the stationary tube has an opening through which the bend holding member moves between the bend position and the retract position;

a power button for switching power ON and OFF; and a control section which moves the bend holding member from the retract position to the bending position after moving the first holding member from the storing position to the operating position, when the power button is turned ON, in cases where the first holding member is at the storing position.

8. An image capturing apparatus, comprising:

an image pickup device for converting an optical image into electrical signals; and an optical system for forming an image of an object on the image pickup device, the optical system including:

a first lens group into which incoming light flux from the object enter along a first optical axis;

a bending member for bending the light flux along the first optical axis to a second optical axis direction which is substantially at right angles to the first optical axis; and a second lens group for leading the light flux, which has been bent into the second optical axis direction, to the image pickup device side, a frame body to include the optical system;

a collapsing lens tube capable of expansion and contraction in the first optical axis, the collapsing lens tube having an opening in a side face of the tube; and a bend holding member for holding the bending member so that the bending member is capable of moving; through the opening of the collapsing lens tube, between a bend position where the bending member bends the light flux into the second optical axis direction, and a retract position where the bending member retracts to create a space for storing the first lens group, wherein the bending member resides at the bend position when the collapsing lens tube is in a expansion state, and resides at the retract position when the collapsing lens tube is in a contraction state, wherein the collapsing lens tube comprises:

a first holding member for holding the first lens group so that the first lens group is movable in a first optical axis direction;

a moving tube which moves the first holding member in the first optical axis direction; and a stationary tube which is fixed on the frame body and provided with a feed member to move the moving tube in the first optical axis direction.

9. The image capturing apparatus of claim 8, wherein the opening of the collapsing optical tube is a hole.

10. The image capturing apparatus of claim 8, further comprising a second holding member for holding the second lens group so that the second lens group is movable in the second optical axis direction.

11. The image capturing apparatus of claim 8, wherein the bending member moves from the bend position to the retract position along the second optical axis.

12. The image capturing apparatus of claim 10, wherein the second holding member moves through the opening of the collapsing optical tube.

13. The image capturing apparatus of claim 8, wherein the feed member is an inner helicoid, and the moving tube comprises:

a rotating tube which has an outer helicoid which screws into the inner helicoids; and a forward moving tube which moves integrally with the rotating tube in the first optical axis direction, wherein each of the rotating tube and the forward moving tube has a respective notch which faces the opening at the operating position.

* * * * *